United States Patent
Yamazaki et al.

(10) Patent No.: US 9,598,304 B2
(45) Date of Patent: Mar. 21, 2017

(54) METHOD FOR MANUFACTURING SOOT GLASS DEPOSIT BODY

(71) Applicant: SUMITOMO ELECTRIC INDUSTRIES, LTD., Osaka-shi, Osaka (JP)

(72) Inventors: Takashi Yamazaki, Yokohama (JP); Tomohiro Ishihara, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/276,073

(22) Filed: May 13, 2014

(65) Prior Publication Data

US 2014/0338400 A1   Nov. 20, 2014

(30) Foreign Application Priority Data

May 15, 2013 (JP) .................................. 2013-103418

(51) Int. Cl.
*F23D 14/22* (2006.01)
*C03B 37/014* (2006.01)
(Continued)

(52) U.S. Cl.
CPC ...... *C03B 37/0142* (2013.01); *C03B 19/1415* (2013.01); *C03B 19/1423* (2013.01);
(Continued)

(58) Field of Classification Search
CPC ...... F23D 11/44; F23D 11/441; F23D 11/443; F23D 11/445; F23D 11/446; F23D 11/448;
(Continued)

(56) References Cited

U.S. PATENT DOCUMENTS 4,148,621 A * 4/1979 Gliemeroth ....... C03B 37/01807
65/417
4,224,046 A * 9/1980 Izawa ................. C03B 37/0142
65/413
(Continued)

FOREIGN PATENT DOCUMENTS

JP   S57-170834 A   10/1982
JP   S63-310744 A   12/1988
(Continued)

OTHER PUBLICATIONS

Notification of Reasons for Refusal issued Dec. 6, 2016 in Japanese Patent Application No. 2013-103418 (3 pages) with an English Translation (8 pages).

*Primary Examiner* — Jodi C Franklin
(74) *Attorney, Agent, or Firm* — Drinker Biddle & Reath LLP

(57) ABSTRACT

A soot glass deposit body is manufactured by placing a starting rod and a burner 22 for producing glass particulates in a reaction container, introducing a source material gas to the burner 22 through a supplying pipe 26, producing glass particulates by a pyrolytic oxidation reaction of the source material gas in a flame formed by the burner 22, and depositing the produced glass particulates on the starting rod. At the time, the source material gas to be supplied to the burner 22 is a siloxane, the burner 22 is heated so that temperature of the burner 22 falls within the range of from −30° C. to +30° C. relative to the boiling point of the siloxane, and also temperature of the supplying pipe is controlled within the range of from the boiling point of the siloxane to the boiling point plus 30° C.

2 Claims, 5 Drawing Sheets

(51) Int. Cl.
   *C03B 19/14* (2006.01)
   *F23D 14/32* (2006.01)

(52) U.S. Cl.
   CPC ........ *C03B 37/01413* (2013.01); *F23D 14/22* (2013.01); *F23D 14/32* (2013.01); *C03B 2207/06* (2013.01); *C03B 2207/20* (2013.01); *C03B 2207/32* (2013.01); *C03B 2207/42* (2013.01); *C03B 2207/46* (2013.01); *C03B 2207/70* (2013.01); *C03B 2207/81* (2013.01); *C03B 2207/85* (2013.01); *Y02E 20/344* (2013.01)

(58) Field of Classification Search
   CPC .......... C03B 37/0142; C03B 37/01413; C03B 19/1415; C03B 19/1423; C03B 2207/81; C03B 2207/14; C03B 2207/80; C03B 2207/85; C03B 2207/22; C03B 2207/46; C03B 2207/66; C03B 2207/90
   See application file for complete search history.

(56) References Cited

U.S. PATENT DOCUMENTS

| | | | | |
|---|---|---|---|---|
| 4,661,140 A * | 4/1987 | Takimoto | .......... | C03B 37/01413 65/157 |
| 5,043,002 A * | 8/1991 | Dobbins | ............. | C03B 19/1415 423/336 |
| 5,735,928 A * | 4/1998 | Sayce | ................. | C03B 19/1423 239/422 |
| 5,979,185 A * | 11/1999 | Blackwell | ............... | C01B 33/18 65/17.4 |
| 6,079,225 A * | 6/2000 | Ruppert | .............. | C03B 19/1423 65/17.2 |
| 6,094,940 A * | 8/2000 | Fujiwara | ............. | C03B 19/1415 261/128 |
| 6,192,713 B1 * | 2/2001 | Zhang | ............... | C03B 37/01807 65/388 |
| 6,312,656 B1 * | 11/2001 | Blackwell | ................ | B01J 19/26 423/337 |
| 6,336,347 B1 * | 1/2002 | Roba | ................... | C03B 19/1415 65/413 |
| 6,487,879 B1 * | 12/2002 | Blackwell | ................. | C03C 3/06 65/413 |
| 6,497,118 B1 * | 12/2002 | Schermerhorn | .... | C03B 19/1407 431/160 |
| 6,565,823 B1 * | 5/2003 | Hawtof | ..................... | B01J 19/26 423/337 |
| 6,672,106 B1 * | 1/2004 | Hawtof | ............... | C03B 19/1423 65/17.2 |
| 7,572,423 B2 * | 8/2009 | Kutsovsky | ............. | B82Y 30/00 423/337 |
| 8,516,855 B2 * | 8/2013 | Fogliani | ............ | C03B 37/0142 65/377 |
| 2004/0237595 A1 * | 12/2004 | Fogliani | ............. | C03B 37/0142 65/421 |
| 2007/0068933 A1 * | 3/2007 | Wilkes | ................... | B01J 8/0015 219/633 |
| 2007/0275335 A1 * | 11/2007 | Biscan | .................... | B22F 3/003 431/160 |
| 2008/0124666 A1 * | 5/2008 | Stocker | ................. | F23C 99/006 431/7 |
| 2010/0186667 A1 * | 7/2010 | Ishii | .................. | C23C 16/45578 118/712 |
| 2011/0059409 A1 * | 3/2011 | Powell | .................. | F23D 11/448 431/161 |
| 2011/0117693 A1 * | 5/2011 | Palm | .................... | F27B 17/0025 438/97 |
| 2013/0133378 A1 * | 5/2013 | Fabian | .............. | C03B 37/01807 65/421 |
| 2013/0248497 A1 * | 9/2013 | Stoeger | .................. | B23K 9/013 219/121.39 |
| 2013/0316136 A1 * | 11/2013 | Hawtof | ............... | C03B 19/1446 428/141 |
| 2014/0058164 A1 * | 2/2014 | Towler | ...................... | C07C 2/78 585/539 |
| 2015/0007611 A1 * | 1/2015 | Badeke | ............... | C03B 19/1415 65/17.4 |
| 2015/0128650 A1 * | 5/2015 | Ishihara | ............... | C03B 37/0142 65/444 |

FOREIGN PATENT DOCUMENTS

| | | |
|---|---|---|
| JP | 2001-509469 A | 7/2001 |
| JP | 2003-81644 A | 3/2003 |
| WO | WO-99/02459 | 1/1999 |

* cited by examiner

METHOD FOR MANUFACTURING SOOT GLASS DEPOSIT BODY

CROSS-REFERENCE TO RELATED APPLICATIONS

This application claims priority from Japanese Patent Application No. 2013-103418, filed on May 15, 2013, the entire contents of which are hereby incorporated by reference.

BACKGROUND

The present invention relates to a method for manufacturing a soot glass deposit body in which glass particulates are deposited on a starting rod by the OVD method (outside vapor deposition method), the VAD method (vapor phase axial deposition method), the MMD method (multi-burner multi-layer deposition method), or the like to manufacture the soot glass deposit body, and a burner for manufacturing a soot glass deposit body, the burner being used for manufacturing the soot glass deposit body.

Hitherto, as a method for manufacturing a glass preform, a manufacturing method including a deposition step of manufacturing a soot glass deposit body by the OVD method, the VAD method, or the like and a transparency-imparting step of heating the soot glass deposit body to prepare a transparent preform. For example, JP-A-2003-81644 discloses a method for manufacturing a soot glass deposit body by supplying a source material glass such as silicon tetrachloride ($SiCl_4$) to a burner.

Recently, as shown in JP-T-2001-509469 (the term "JP-T" as used herein means a published Japanese translation of a PCT patent application), there is a case where a siloxane is used as a source material of a soot glass deposit body instead of $SiCl_4$.

In the production methods described in JP-A-2003-81644 and JP-T-2001-509469, for stably supplying the source gas material to the burner, all or part of a pipe for supplying the source material gas to the burner side is heated. However, in the case where a siloxane is used as the source material, it is a problem that the source material gas supplied to the burner is cooled and liquefied in the burner and hence cannot be appropriately spouted from the burner.

SUMMARY

For the purpose of solving the above problem, the present invention provides a method for manufacturing a soot glass deposit body and a burner for manufacturing a soot glass deposit body, in which a siloxane as a source material gas is prevented from being liquefied and the burner is not clogged.

The method for manufacturing a soot glass deposit body of the invention is a method for manufacturing a soot glass deposit body, the method comprising a depositing step of placing a starting rod and a burner for producing glass particulates in a reaction container, introducing a source material gas to the burner through a supplying pipe, producing glass particulates by a pyrolytic oxidation reaction of the source material gas in a flame formed by the burner, and depositing the produced glass particulates on the starting rod to prepare a soot glass deposit body, wherein the source material gas to be supplied to the burner is a siloxane and the burner is heated so that temperature of the burner falls within the range of from −30° C. to +30° C. relative to the boiling point of the siloxane and the supplying pipe is heated so that temperature of the supplying pipe falls within the range of from the boiling point of the siloxane to the boiling point plus 30° C.

Moreover, the burner for manufacturing a soot glass deposit body of the invention is a burner for manufacturing a soot glass deposit body, the soot glass deposit body being formed using a siloxane as a source material gas, wherein the burner possesses a heater for heating the burner and is constituted by a metal.

According to the method for manufacturing a soot glass deposit body and the burner for manufacturing a soot glass deposit body of the invention, liquefaction of a siloxane as a source material gas can be prevented and clogging of the burner can be prevented.

DETAILED DESCRIPTION

[Summary of Embodiment of the Invention]

Figure 1:
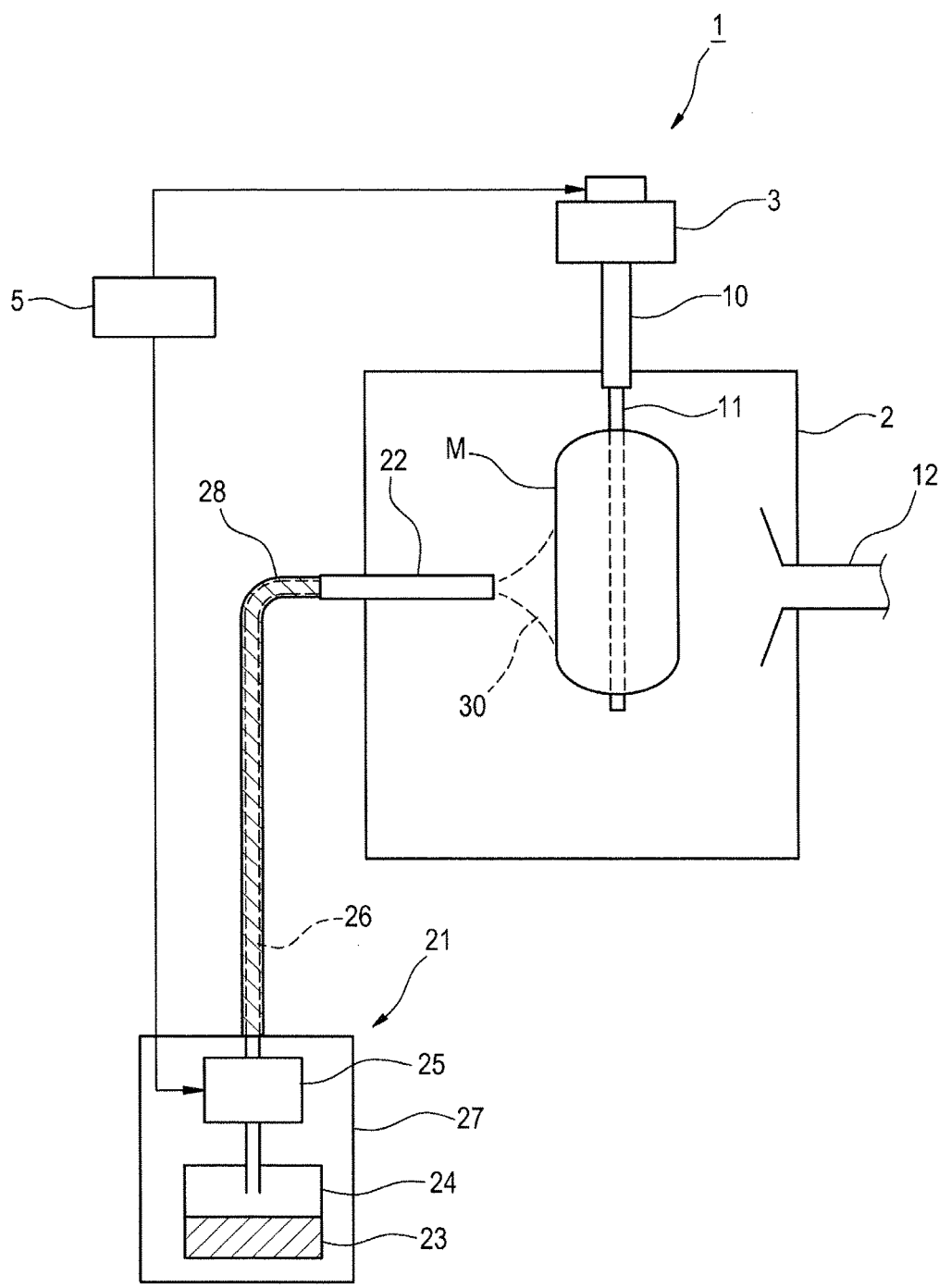
FIG. 1 is a block diagram showing one embodiment of a manufacturing equipment for carrying out the method for manufacturing a soot glass deposit body according to the invention.

First, contents of embodiments of the invention are listed and explained.

The method for manufacturing a soot glass deposit body according to an embodiment of the invention possesses the following characteristic (1):

(1) a method for manufacturing a soot glass deposit body, the method comprising a depositing step of placing a starting rod and a burner for producing glass particulates in a reaction container, introducing a source material gas to the burner through a supplying pipe, producing glass particulates by a pyrolytic oxidation reaction of the source material gas in a flame formed by the burner, and depositing the produced glass particulates on the starting rod to prepare a soot glass deposit body, wherein the source material gas to be supplied to the burner is a siloxane and the burner is heated so that temperature of the burner falls within the range of from −30° C. to +30° C. relative to the boiling point of the siloxane and the supplying pipe is heated so that temperature of the supplying pipe falls within the range of from the boiling point of the siloxane to the boiling point plus 30° C.

Since the method for manufacturing a soot glass deposit body according to the embodiment of the invention possesses the above characteristic (1), a siloxane as a source material gas can be prevented from being liquefied inside the burner and the supplying pipe and clogging of the burner can be prevented.

The method for manufacturing a soot glass deposit body according to the embodiment of the invention more preferably possesses at least any of the following characteristics (2) to (4):

(2) the burner is constituted by a metal, (3) a heater for heating the burner is provided on an outer circumferential part of the burner, (4) a heater for heating the burner is provided inside the outer casing of the burner.

When the method for manufacturing a soot glass deposit body according to the embodiment of the invention possesses the above characteristic (2), there can be provided a burner having a good thermal conductivity and excellent thermal resistance and the like.

Moreover, when the method for manufacturing a soot glass deposit body according to the embodiment of the invention possesses the above characteristic (3), the temperature of the burner can be easily kept a temperature at which the siloxane is not liquefied.

Furthermore, when the method for manufacturing a soot glass deposit body according to the embodiment of the invention possesses the above characteristic (4), a port provided inside the burner and supplied with the source material gas can be surely heated by the heater provided inside with relatively little calories.

In addition, the burner for manufacturing a soot glass deposit body according to an embodiment of the invention possesses the following characteristic (5):

(5) a burner for manufacturing a soot glass deposit body, the soot glass deposit body being formed using a siloxane as a source material gas, wherein the burner is constituted by a metal and possesses a heater for heating the burner.

Since the burner for manufacturing a soot glass deposit body according to the embodiment of the invention possesses the above characteristic (5), a siloxane as a source material gas is prevented from being liquefied inside the burner and clogging of the burner is prevented by appropriately heating the burner by the heater.

The burner for manufacturing a soot glass deposit body according to the embodiment of the invention more preferably possesses the following characteristic (6) or (7):

(6) the heater is provided on an outer circumferential part of the burner, (7) the heater is provided inside the outer casing of the burner.

When the burner for manufacturing a soot glass deposit body according to the embodiment of the invention possesses the above characteristic (6), the temperature of the burner can be kept a temperature at which the siloxane is not liquefied with a simple and convenient configuration.

When the burner for manufacturing a soot glass deposit body according to the embodiment of the invention possesses the above characteristic (7), a source material gas port provided inside the burner can be surely heated by the heater provided inside with relatively little calories.

[Details of Embodiments of the Invention]
(First Embodiment)

The following describes first embodiment of the method for manufacturing a soot glass deposit body and the burner for manufacturing a soot glass deposit body according to the invention with reference to attached drawings. As the manufacturing method shown below, the OVD (Outside Vapor Deposition) method is explained as an example but the invention is not limited to the OVD method. It is also possible to apply the invention to a method of depositing glass from a source material gas, for example, the VAD (Vapor Phase Axial Deposition) method, the MMD method, or the like similarly to the OVD method.

FIG. 1 is a block diagram showing one embodiment of a manufacturing equipment 1 for carrying out the method for manufacturing a soot glass deposit body according to the invention. The manufacturing equipment 1 comprises a reaction container 2, a lifting and rotating device 3, a gas supplying device 21, a burner for producing glass particulates 22, and a controlling unit 5 for controlling action of each unit.

The reaction container 2 is a container in which the soot glass deposit body M is formed, and possesses an exhaust pipe 12 attached to a side face of the container.

The lifting and rotating device 3 is a device of lifting and rotating the soot glass deposit body M through a supporting rod 10 and a starting rod 11. The lifting and rotating device 3 controls the action of the supporting rod 10 based on a control signal transmitted from the control unit 5. The lifting and rotating device 3 lifts and lowers the soot glass deposit body M with turning.

The supporting rod 10 is placed with being inserted through a through hole formed at an upper wall of the reaction container 2 and the starting rod 11 is attached to one end part (lower end part in FIG. 1) placed inside the reaction container 2. The supporting rod 10 is gripped by the lifting and rotating device 3 at another end part (upper end part in FIG. 1) thereof.

The starting rod 11 is a rod on which glass particulates are deposited and is attached to the supporting rod 10.

The exhaust pipe 12 is a pipe for discharging glass particulates and the like not adhered to the starting rod 11 and the soot glass deposit body M into outside of the reaction container 2 together with the gas in the reaction container 2.

To the burner 22, a siloxane is vaporized and supplied as a source material 23 through a gas supplying device 21. As the siloxane, there may be used octamethylcyclotetrasiloxane (OMCTS) having a melting point of 17.5° C. and a boiling point of 175° C., decamethylcyclopentasiloxane (DMCPS) having a melting point of −38° C. and a boiling point of 210° C., hexamethylcyclotrisiloxane having a melting point of 64° C. and a boiling point of 134° C., hexamethyldisiloxane having a melting point of −68° C. and a boiling point of 100° C., and the like. In the example, an example using OMCTS as the siloxane is explained. In FIG. 1, a gas supplying device for supplying a flame forming gas to the burner 22 was omitted.

The gas supplying device 21 comprises a source material container 24 for storing the source material 23, MFC (Mass Flow Controller) 25 as a gas flow rate control device for controlling a supply flow rate of the source material gas obtained by vaporizing the source material 23, a supplying pipe 26 for introducing the source material gas to the burner 22, and a temperature controlled booth 27 for keeping the source material container 24, MFC 25, and part of the supplying pipe 26 at a predetermined temperature. The source material container 24, MFC 25, and the supplying pipe 26 are controlled to the predetermined temperature through temperature control by the gas supplying device 21.

MFC 25 is a device for controlling the flow rate of the source material gas to be spouted from the burner 22. The source material gas heated so as to have a temperature of the boiling point (e.g., 175° C. that is a standard boiling point of OMCTS) or higher in the source material container 24 and vaporized is supplied to the burner 22 with controlling the flow rate by MFC 25. MFC 25 controls the supply amount of the source material gas to be supplied to the burner 22 based on a control signal transmitted from the control unit 5.

The supplying pipe 26 is a pipe for introducing the source material gas to the burner 22. In order to keep the temperature of the supplying pipe 26 at a high temperature, for example, a tape heater 28 that is a heating element is wound on the outer circumference of the supplying pipe 26. The tape heater 28 is composed of a flexible heater in which extrafine twisted wires of a metal heating element or a carbon-made fibrous planar heating element are covered with a protective material. When the tape heater 28 is energized, the supplying pipe 26 is heated so as to have a temperature falling within the range of from the boiling point of the siloxane to the boiling point plus 30° C. Thereby, the temperature of the source material gas is kept so that the siloxane is not liquefied in the supplying pipe 26. In this connection, the reason for controlling the temperature of the supplying pipe 26 to the boiling point of the siloxane plus 30° C. or lower is that there is a possibility of converting the siloxane into particles by a polymerization reaction to induce clogging of the supplying pipe 26 when the pipe is heated to the boiling point plus 30° C. or higher.

The burner 22 is connected to the supplying pipe 26 and is composed of a metal material. As the metal material, it is particularly preferred to use stainless steel (SUS) excellent in corrosion resistance. The burner 22 produces glass particulates 30 by subjecting the vaporized source material gas to a pyrolytic oxidation reaction in the flame and spouts the produced glass particulates 30 to the starting rod 11 to deposit them. Specifically, to the burner 22, a siloxane gas such as OMCTS as a source material gas, $H_2$, $O_2$, and the like as flame forming gases, and an inert gas such as $N_2$ or Ar as a burner seal gas. In the oxyhydrogen flame of the burner 22, the glass particulates 30 are produced by the pyrolytic oxidation reaction and the produced glass particulates 30 are deposited on the starting rod 11, thereby preparing a soot glass deposit body M having a predetermined outer diameter.

The control unit 5 controls each action of the lifting and rotating device 3, the gas supplying device 21, and the like. The control unit 5 transmits, to the lifting and rotating device 3, a control signal that controls a lifting rate and a rotation rate of the soot glass deposit body M. Also, the control unit 5 transmits, to MFC 25 of the gas supplying device 21, a control signal that controls the flow rate of the source material gas to be spouted from the burner 22 to the starting rod 11 (soot glass deposit body M).

In order to spout the source material gas or the flame forming gas, as the burner 22, for example, there may be used focused multinozzle structured one or multiple pipe burner structured one. In the example, explanation is made using the focused multinozzle structured one as an example.

Figure 2:
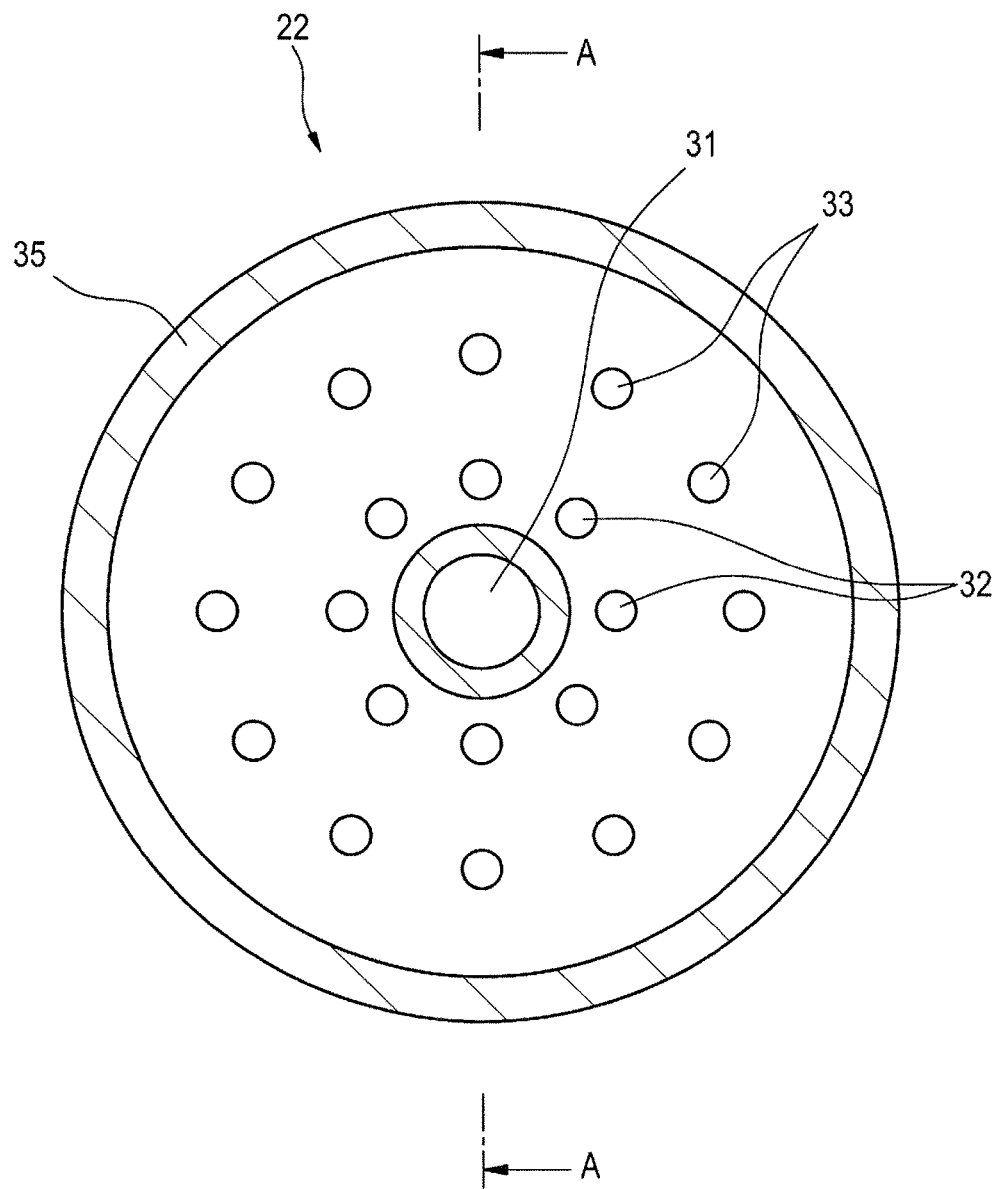
FIG. 2 is a front view showing first embodiment of a burner for producing glass particulates.
Figure 3:
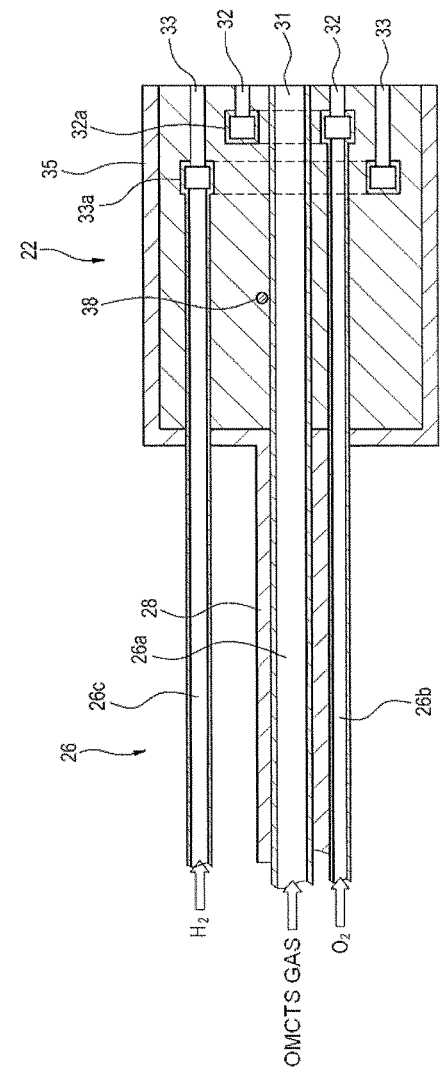
FIG. 3 is an A-A cross-sectional view of the burner shown in FIG. 2.

FIGS. 2 and 3 show one embodiment of the burner 22 having a focused multinozzle structure.

The burner 22 shown in FIG. 2 has a source material gas port 31 that spouts a siloxane as a source material gas at the center. A plurality of combustion-assisting gas ports 32 that spout a combustion-assisting gas are concentrically disposed around the source material gas port 31. Furthermore, a plurality of combustible gas ports 33 that spout a combustible gas are concentrically disposed around the combustion-assisting gas ports 32 concentrically disposed. From the source material gas port 31 at the center, for example, OMCTS gas is spouted as a source material gas. From the combustion assisting gas ports 32, oxygen ($O_2$) as a combustion assisting gas is spouted and, from the combustible gas ports 33, hydrogen ($H_2$) or the like as a combustible gas is spouted.

At the burner 22, OMCTS gas is spouted into an oxyhydrogen flame generated by the combustion assisting gas and the combustible gas ports 33, and silicon oxide ($SiO_2$) particles are synthesized by a pyrolytic oxidation reaction.

As shown in FIG. 3, the source material gas port 31 of the burner 22 is connected to a supplying pipe 26a for the source material gas port of the supplying pipe 26, and OMCTS gas is introduced from the supplying pipe 26a for the source material gas port.

A plurality of the combustion assisting gas ports 32 are connected to one another through a ring-shaped ring pipe 32a in the inside of the burner 22. The ring pipe 32a is connected to a supplying pipe 26b for the combustion assisting gas port of the supplying pipe 26, and $O_2$ is introduced into individual combustion assisting gas ports 32 from the supplying pipe 26b for combustion-assisting gas port through the ring pipe 32a.

A plurality of the combustible gas ports 33 are connected to one another through a ring-shaped ring pipe 33a in the inside of the burner 22. The ring pipe 33a is connected to a supplying pipe 26c for the combustible gas port of the supplying pipe 26, and $H_2$ is introduced into individual combustible gas ports 33 from the supplying pipe 26c for the combustible gas port through the ring pipe 33a.

As shown in FIGS. 2 and 3, in order to keep the temperature of the burner 22 at a high temperature, a heater 35 as a heating element is provided on the outer circumferential part of the burner 22. As the heater 35, a tape heater similar to the tape heater 28 is preferably used. The heater 35 has a temperature control sensor not shown in the figure and the temperature of the heater 35 is detected by the temperature control sensor. Moreover, a temperature measuring means for control (thermocouple 38) is placed in the vicinity of the source material gas port 31 and the temperature of the burner 22 is detected. When the heater 35 is energized, the burner 22 is heated so that temperature of the burner falls within the range of from −30° C. to +30° C. relative to the boiling point of the siloxane that is the source material gas 23. Thereby, the temperature is kept so that the siloxane to be spouted from the burner 22 is not liquefied and also the burner 22 is prevented from being clogged resulting from the formation of particles of the siloxane by a polymerization reaction. Incidentally, the reason why the temperature of the burner 22 is controlled to −30° C. or higher relative to the boiling point of the siloxane is that, when the temperature of the supplying pipe 26 is equal to or higher than the boiling point of the siloxane, the source material gas is not liquefied even if the burner 22 is not heated to the boiling temperature or higher. However, when the temperature of the burner 22 is lower than the temperature of the boiling point minus 30° C., there is a possibility of liquefaction of the source material gas.

Next, a procedure of the method for manufacturing a soot glass deposit body is described.

[Deposition Step]

Glass particulates are deposited by the OVD method (outside vapor deposition method) to manufacture a soot glass deposit body M. First, as shown in FIG. 1, a supporting rod 10 is attached to the lifting and rotating device 3 and, in a state that the starting rod 11 is further attached to the lower end part of the supporting rod 10, the starting rod 11 and part of the supporting rod 10 are placed in the reaction container 2.

Subsequently, MFC 25 supplies the source material gas to the burner 22 through the supplying pipe 26 (supplying pipe 26a for the source material gas port) with controlling the supply of the source material gas based on a control signal transmitted from the control unit 5. At the time, the supplying pipe 26 is heated by the tape heater 28 wound on the outer circumferential part thereof so as to have a temperature falling within the range of from the boiling point of the siloxane as the source material gas to the boiling point plus 30° C. Moreover, by a gas supplying device not shown in the figure, $O_2$ and $H_2$ are supplied through the supplying pipe 26b for the combustion-assisting gas port and the supplying pipe 26c for the combustible gas port.

Subsequently, the siloxane supplied to the burner 22 is subjected to a pyrolytic oxidation reaction in an oxyhydrogen flame to thereby produce glass particulates.

The burner 22 continuously deposits the glass particulates produced in the flame on the starting rod 11 that is rotated and lifted. At the time, the burner 22 is heated by the heater 35 provided on the outer circumferential part thereof so as to have a temperature falling within the range of from −30° C. to +30° C. relative to the boiling point of the siloxane.

The lifting and rotating device 3 lifts or lowers the starting rod 11 and the soot glass deposit body M deposited on the starting rod 11 in an axial direction based on a control signal from the control unit 5.

[Transparency-Imparting Step]

Next, after the resulting soot glass deposit body M is heated in a mixed atmosphere of an inert gas and chlorine gas, the deposited body is further heated in a He atmosphere to obtain a transparent glass preform.

As described in the above, in the present embodiment, the burner 22 is heated so that the temperature of the burner 22 for spouting the source material gas falls within the range of from −30° C. to +30° C. relative to the boiling point of the siloxane as the source material gas and the supplying pipe 26 is heated so that the temperature of the supplying pipe 26 falls within the range of from the boiling point of the siloxane to the boiling point plus 30° C. Therefore, the siloxane is prevented from being liquefied inside the burner 22 and also the soot glass deposit body can be manufactured without troubles such as the clogging of the burner 22.

Moreover, according to the present embodiment, since the burner 22 is constituted by a metal, a burner 22 having a good thermal conductivity and excellent thermal resistance and the like can be provided.

Furthermore, according to the present embodiment, a heater 35 for heating the burner 22 is provided on the outer circumferential part of the burner 22. Thereby, the temperature of the burner 22 can be kept at a temperature at which the source material gas 23 is not liquefied with a simple and convenient configuration that a tape heater or the like is only wound on the outer circumferential part of a conventional heater.

(Second Embodiment)

Next, a burner for manufacturing a soot glass deposit body according to the second embodiment is described with reference to FIGS. 4 and 5. For the same configuration as in the first embodiment, explanation thereof is omitted.

Figure 4:
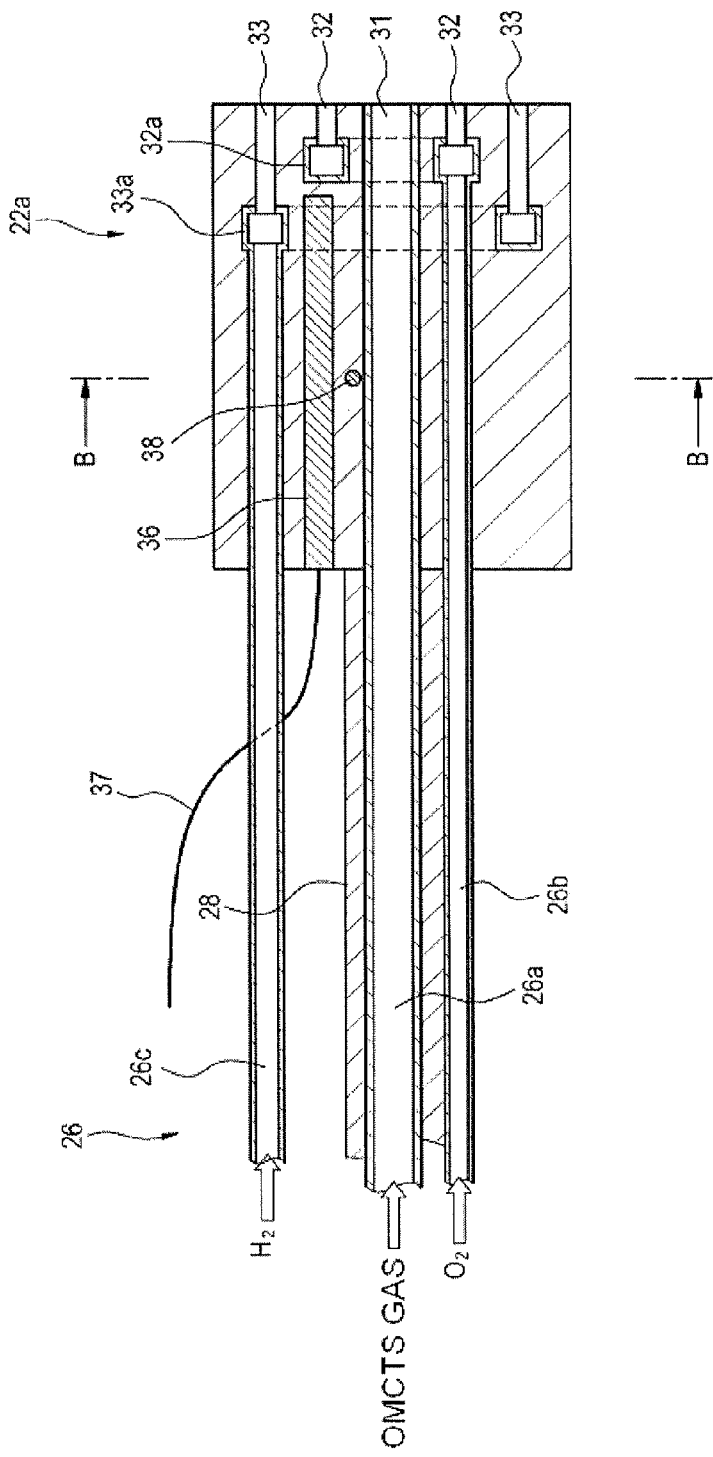
FIG. 4 is a cross-sectional view similar to FIG. 3, showing second embodiment of a burner for producing glass particulates.

As shown in FIG. 4, the burner 22a according to the second embodiment comprises a source material gas port 31 for spouting OMCTS gas as a source material gas, a combustion assisting gas port 32 for spouting $O_2$ as a combustion assisting gas, and a combustible gas port 33 for spouting $H_2$ as a combustible gas. An embedded heater 36 is provided inside the burner 22a.

The heater 36 is disposed so as to be adjacent and substantially parallel to the source material gas port 31 along the longitudinal direction of the source material gas port 31. As the heater 36, a metal body such as Nichrome wire having a high thermal resistance is preferably used. For providing the heater 36, it is sufficient that a hole is formed inside the burner 22a and the metal body is inserted thereinto. A lead wire 37 for heating the heater 36 is connected to the end part of the heater 36 at the supplying pipe 26 side.

Figure 5:
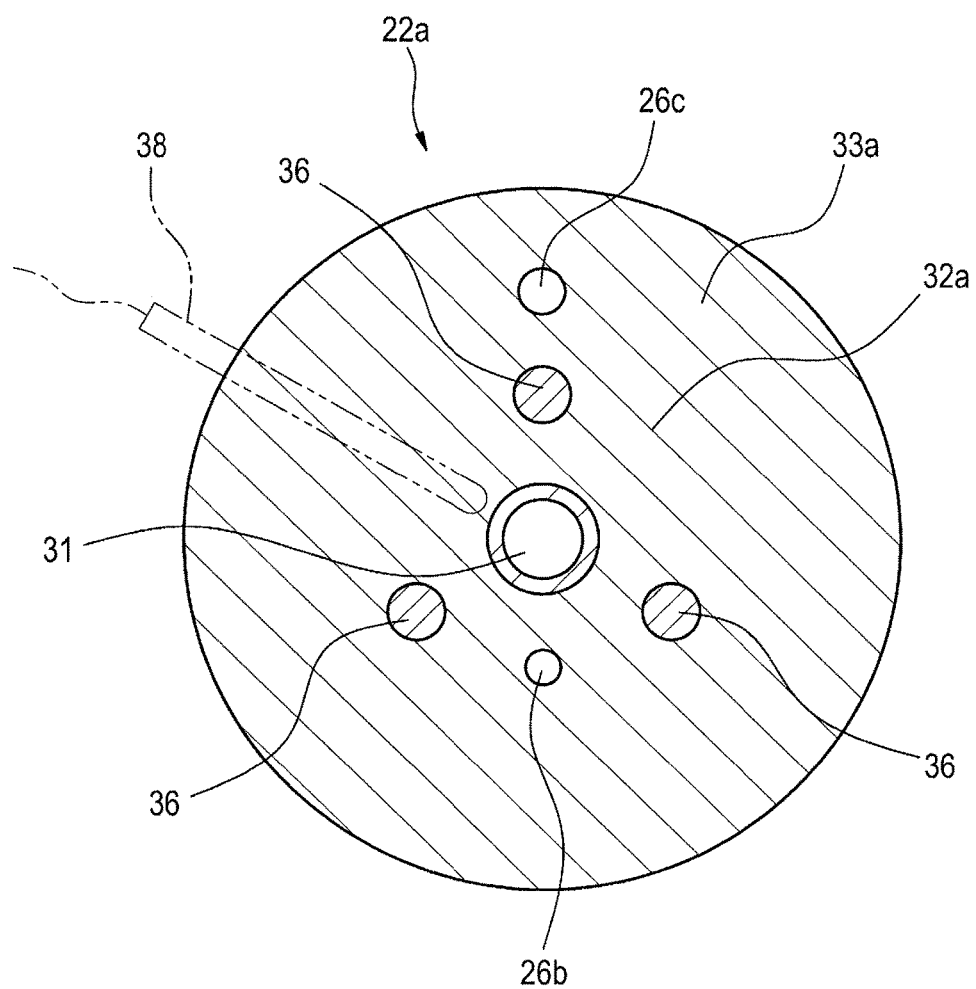
FIG. 5 is a B-B cross-sectional view of the burner shown in FIG. 4, seen from a front direction.

As shown in FIG. 5, the heater 36 is provided equally in plural pieces (here, three pieces) around the source material gas port 31. Each heater 36 has a temperature control sensor not shown in the figure and the temperature of the heater 36 is detected by the temperature control sensor. Moreover, as shown in FIGS. 4 and 5, in the vicinity of the source material gas port 31, a temperature measuring means for control (thermocouple 38) is placed, which detects the temperature of the burner 22a. When each heater 36 is energized through the lead wire 37, the burner 22a is heated so as to have a temperature falling within the range of from −30° C. to +30° C. relative to the boiling point of the siloxane.

As above, in the second embodiment, the heater 36 is embedded type one and is provided inside the outer casing of the burner 22a. Namely, the heater 36 is provided closer to the source material gas port 31 as compared with the heater 35 of the first embodiment that is provided on the outer circumferential part of the burner 22. Therefore, the source material gas port 31 provided inside the burner 22a can be surely heated with relatively little calories.

EXAMPLES

Using the manufacturing equipment shown in FIG. 1, deposition of glass particulates, i.e., manufacture of a soot glass deposit body was performed by the OVD method. As a burner, as explained in the first embodiment, there was used one in which a tape heater was wound on the outer circumferential part of the burner. To the burner, OMCTS gas was supplied as a source material gas and $H_2$ and $O_2$ were supplied as flame forming gases.

At the time, the temperature (° C.) of the supplying pipe and the temperature (° C.) of the burner were appropriately selected and there were evaluated whether OMCTS gas was liquefied or not (the case where the gas was not liquefied is marked O and the case where the gas was liquefied is marked x) and whether the source material gas port inside the burner was clogged or not (the case where it was not clogged is marked O and the case where it was clogged is marked x). Table 1 shows results thereof.

TABLE 1

| | Pipe temperature (° C.) | Burner temperature (° C.) | Liquefaction | Clogging |
|---|---|---|---|---|
| Example 1 | 180 | 170 | o | o |
| Example 2 | 200 | 165 | o | o |
| Comparative Example 1 | 200 | 215 | o | x |
| Comparative Example 2 | 200 | 144 | x | o |

Example 1

In Example 1, OMCTS gas was supplied with controlling the pipe temperature to 180° C. and the burner temperature to 170° C., thereby performing the manufacture of a soot glass deposit body.

As a result, in Example 1, liquefaction of the OMCTS gas and clogging of the source material gas port were not observed.

Example 2

In Example 2, OMCTS gas was supplied with controlling the pipe temperature to 200° C. and the burner temperature to 165° C., thereby performing the manufacture of a soot glass deposit body.

As a result, also in Example 2, liquefaction of the OMCTS gas and clogging of the source material gas port were not observed.

Comparative Example 1

In Comparative Example 1, OMCTS gas was supplied with controlling the pipe temperature to 200° C. and the burner temperature to 215° C., thereby performing the manufacture of a soot glass deposit body.

As a result, in Comparative Example 1, liquefaction of the OMCTS gas was not observed but the source material gas port was clogged.

Comparative Example 2

In Comparative Example 2, OMCTS gas was supplied with controlling the pipe temperature to 200° C. and the burner temperature to 144° C., thereby performing the manufacture of a soot glass deposit body.

As a result, in Comparative Example 2, clogging of the source material gas port was not observed but the OMCTS gas was liquefied inside the burner.

From the above, as in Examples 1 and 2, when the configuration of the first embodiment was adopted, the burner was heated so that the temperature of the burner fallen within the range of from 145° C. to 205° C. that is the range of from −30° C. to +30° C. relative to 175° C. as the boiling point of OMCTS and the supplying pipe was heated so that the temperature of the supplying pipe fallen within the range of from 175° C. to 205° C., it was able to confirm that OMCTS was not liquefied inside the burner and clogging of the burner did not occur.

Next, as a burner, using one provided with an embedded heater as explained in the second embodiment, a soot glass deposit body was manufactured. To the burner, OMCTS gas was supplied as a source material gas and $H_2$ and $O_2$ were supplied as flame forming gases.

At the time, the temperature (° C.) of the supplying pipe and the temperature (° C.) of the burner were appropriately selected and there were evaluated whether OMCTS gas is liquefied or not and whether the source material gas port inside the burner is clogged or not, similarly to the first embodiment. As a result, similarly to the first embodiment, when the burner was heated so that the temperature of the burner fallen within the range of from 145° C. to 205° C. that is the range of from −30° C. to +30° C. relative to 175° C. as the boiling point of OMCTS and the supplying pipe was heated so that the temperature of the supplying pipe fallen within the range of from 175° C. to 205° C., it was able to confirm that OMCTS was not liquefied and also clogging of the burner did not occur.

Incidentally, the method for manufacturing a soot glass deposit body and a glass preform of the invention is not limited to the aforementioned embodiments, and proper modifications and improvements can be arbitrarily made.

For example, in the above embodiments, the burners 22, 22a are constituted by a metal but the invention is not limited to the examples. For example, the burner may be formed of a ceramic or quartz.

Moreover, in the above embodiments, the burner 22 is heated so that temperature of the burner 22 falls within the range of from −30° C. to +30° C. relative to the boiling point of the siloxane and the supplying pipe 26 is heated so that temperature of the supplying pipe 26 falls within the range of from the boiling point of the siloxane to the boiling point plus 30° C. However, when the temperature of the supplying pipe 26 is rather high within the above temperature range, the temperature of the burner 22 may be rather low within the above temperature range to such a degree that the siloxane is not liquefied.

The invention claimed is:

1. A method for manufacturing a soot glass deposit body, the method comprising a depositing step of placing a starting rod and a burner for producing glass particulates in a reaction container, introducing a source material gas to the burner through a supplying pipe, producing glass particulates by a pyrolytic oxidation reaction of the source material gas in a flame formed by the burner, and depositing the produced glass particulates on the starting rod to prepare a soot glass deposit body, wherein the source material gas supply pipe is disposed in the center of the burner in the longitudinal direction thereby providing a port in the center of the burner face to spout the source material gas, wherein a plurality of combustion-assisting gas ports are concentrically disposed around the source material gas port and a plurality of combustible gas ports are concentrically disposed around the combustion-assisting gas ports, the source material gas to be supplied to the annular burner is a siloxane, the burner is heated so that temperature of the burner falls within the range of from −10° C. to +30° C. relative to the boiling point of the siloxane and the supplying pipe is heated so that temperature of the supplying pipe falls within the range of from the boiling point of the siloxane to the boiling point plus 30° C., and wherein a heater for heating the burner is provided inside the outer casing of the burner and is disposed so as to be adjacent and substantially parallel in the longitudinal direction to the source material gas supply pipe.

2. The method for manufacturing a soot glass deposit body according to claim 1, wherein the burner is constituted by a metal.

* * * * *